Sept. 11, 1928.  R. MURPHY  1,683,624
CLUTCH CONSTRUCTION
Filed Sept. 4, 1924
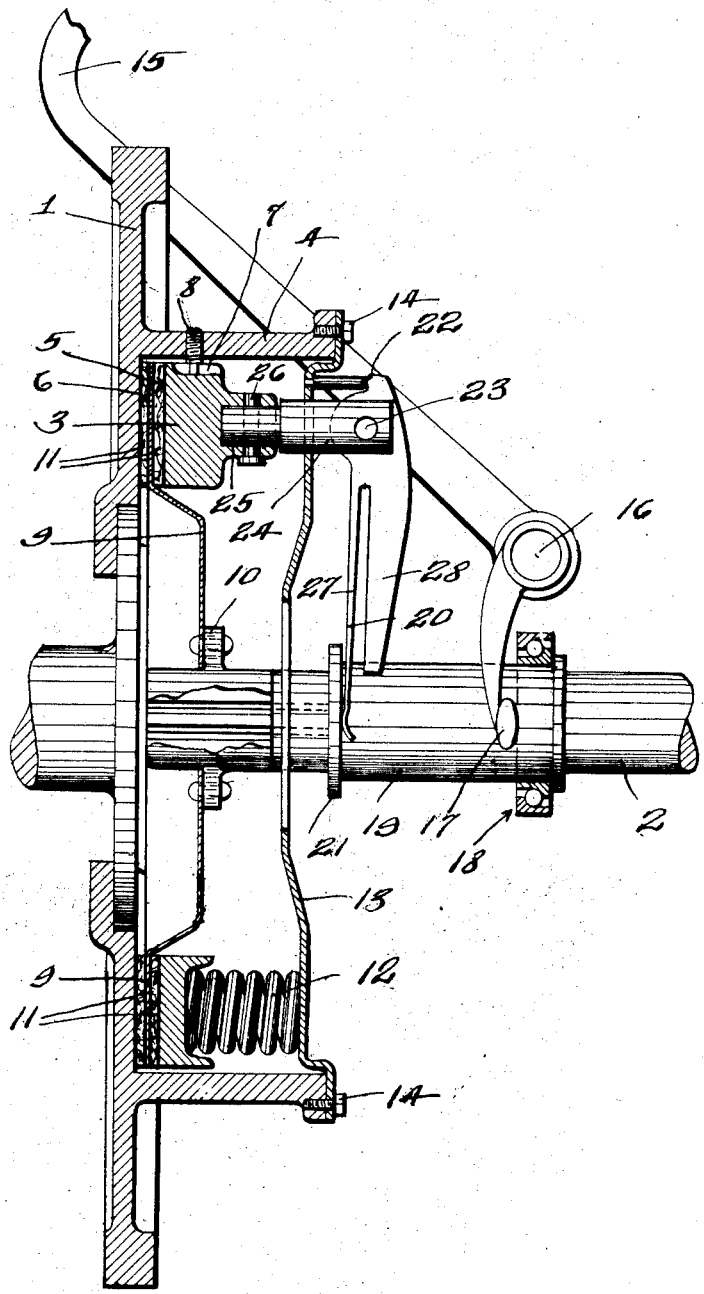
INVENTOR.
Ralph Murphy.
BY
Pawrns & Brdell
ATTORNEY Patented Sept. 11, 1928.

1,683,624

UNITED STATES PATENT OFFICE.

RALPH MURPHY, OF SYRACUSE, NEW YORK, ASSIGNOR, BY MESNE ASSIGNMENTS, TO FRANKLIN DEVELOPMENT CORPORATION, OF SYRACUSE, NEW YORK, A CORPORATION OF NEW YORK.

CLUTCH CONSTRUCTION.

Application filed September 4, 1924. Serial No. 735,826.

This invention relates to friction clutches such as are used in motor vehicles and has for its object a particularly simple and efficient means for positively releasing the clutch when the clutch pedal is depressed and for yieldingly transmitting the motion of the clutch pedal to the pressure ring or other releasable element of the clutch.

The invention consists in the novel features and in the combinations and constructions hereinafter set forth and claimed and described.

In describing this invention, reference is had to the accompanying drawing which is a vertical sectional view of a clutch embodying my invention.

This clutch comprises, generally driving and driven elements, one of which is axially shiftable or includes an axially shiftable member, spring means for pressing the shiftable member into clutching position and operating means comprising a prime mover as a clutch pedal and motion transmitting means connected to the shiftable member to withdraw the same, and comprising spring means by which the shiftable member is yieldingly reengaged or by which the sudden reengagement and hence grabbing is eliminated. More specifically, the clutch here illustrated comprises a pressure member as a ring rotatable with one of said elements, the ring and the element with which it is associated having opposing clutch faces, friction means as a plate rotatable with the other element and extending between said faces, spring means as one or more springs tending to thrust the pressure member into clutching position and clutch releasing means including a prime mover and connections between the prime mover and the pressure member or ring to effect the positive withdrawal of the pressure ring upon the actuation of the prime mover, such connections also including flexible means by which the motion of the prime mover is yieldingly transferred to the pressure member to engage the clutch.

1 designates the driving element which is usually the fly wheel of the internal combustion engine of the vehicle.

2 is a driven element which is usually a shaft having a pilot bearing in the fly wheel, the shaft 2 being connected at its rear end to the transmission gearing or serving as the driving shaft of such transmission gearing, as will be understood by those skilled in the art.

3 is the pressure member usually in the form of a ring, this pressure ring being located in a cylindrical recess associated with the fly wheel 1 and formed by providing a cylindrical flange 4 on the rear side of the fly wheel, the pressure ring 3 having a face 5 opposed to an annular face 6 on the fly wheel or on the bottom of the recess inclosed by the flange 4. This ring 3 is rotatable with the fly wheel and is shown as formed with one or more slots as 7 for receiving a key or pin as 8 projecting radially inwardly from the cylindrical wall 4.

The clutch here shown is of the single plate type, although it may be any other form of friction clutch as a multiple disk clutch, cone clutch, etc.

9 designates the friction plate secured to a hub 10 slidable axially of the shaft 2 and slidably keyed or splined to the shaft 2 as will be understood by those skilled in the art. The friction plate 9 extends between face 5 of the pressure ring 3 and the face 6 of the fly wheel, and is provided with friction disks 11 on opposite sides thereof.

The pressure ring is normally thrust into pressing position in any well known manner as by a plurality of springs as the springs 12 interposed between the pressure ring and a plate 13 secured to the rear end of the cylindrical wall 4, the plate being secured in position in any suitable manner as by screws 14.

The operating means includes a suitable prime mover as a lever or pedal 15 mounted upon a rock shaft 16 in the usual manner and having a yoke or arm 17 coacting with the throw out bearing 18, a throw out sleeve or collar 19 slidable axially of the shaft 2 and on which said bearing 18 is mounted, and motion transmitting connections between the sleeve 19 and the pressure ring, such connections being connected to the pressure ring to positively withdraw it upon the depression of the pedal 15 and such connections also embodying spring means by which the pressure ring is yieldingly withdrawn or by which relative motion of the prime mover or pedal 15 takes place during the yielding of such connection.

The construction as here shown includes a series of levers as the lever 20 extending outwardly or tangentially relatively to the sleeve 19 and engaging at its inner end with a collar or flange 21 on the sleeve and being fulcrumed at 22 at its outer end and pivoted between its ends near its outer end at 23 to a pull rod or link 24 which is secured to the pressure ring. There are usually three levers 20 and three pull rods or links 24. The fulcrums 22 are blocks secured to the cover plate 13. Each rod or link 24 has a reduced portion 25 extending into a socket formed in a boss on the rear side of the pressure ring and each of these reduced portions 25 is secured to the boss by a transversely extending pin 26. The spring or yielding means is provided by forming a portion of the lever yielding or resilient, this portion being arranged to tension during the initial movement of the clutch pedal 15 and hence, gradually engage or release the pressure ring.

Preferably, in order to insure positive release of the clutch, means is provided for forming a rigid connection between the prime mover and the shiftable element or pressure ring after the yielding means has yielded a predetermined amount. As here illustrated, each lever 20 is formed bifurcated with a rigid branch 28 located in the rear of the resilient branch 27, to limit the flexing thereof, the resilient branch coacting with the throw-out collar or the flange 21 thereof. In operating the clutch pedal or prime mover to throw out the clutch, the resilient arm first flexes until the flexing thereof is limited by the rigid arm 28, and upon further depression of the clutch pedal the motion of the throw out collar is transmitted by the rigid arm.

In operation, upon the depression of the prime mover or foot pedal 15, the throw out collar or sleeve 19 is pulled rearwardly thus pulling the branches 27 of the levers 20 rearwardly and as these arms are of spring material and capable of yielding, relative movement of the foot pedal takes place before the branches 27 of the levers are tensioned to overcome the main springs 12 sufficiently to entirely release the clutch. In engaging the reverse takes place, the friction surfaces are brought into contact at first with very light spring pressure, the spring pressure increasing as the pressure on the foot lever is withdrawn. Thus the pressure plate 3 is pressed gradually into clutching position and the yielding member provides a smooth acting clutch, free from grabbing.

What I claim is:—

1. In a clutch, the combination of driving and driven elements, one including an axially shiftable member, spring means for thrusting said member into clutching position, and operating means for shifting said member out of clutching position, comprising a prime mover, and connections between the prime mover and the shiftable member, comprising a throw-out collar, a lever extending outwardly relatively to the throw-out collar and pressing at its inner end against the throw-out collar, and being fulcrumed at its outer end, and a pull link connected at one end to the shiftable member, the lever being pivoted to the other end of the pull link, the lever having a resilient portion.

2. In a clutch, the combination of driving and driven elements, a pressure ring rotatable with one of said elements, the ring and such element having opposing friction faces, a friction plate rotatable with the other element, and extending between said faces, spring means tending to press the pressure ring into clutching position, and operating means for releasing the clutch, comprising a throw-out sleeve arranged coaxially of the clutch, a lever thrusting at one end against the throw-out sleeve to be actuated thereby, and fulcrumed at its other end on the element, with which the pressure ring rotates, and a pull link connected to the pressure ring and the lever, a portion of the lever being resilient for yieldingly transmitting the motion of the throw-out sleeve to the pressure ring.

3. In a clutch, the combination of driving and driven elements, a pressure ring rotatable with one of said elements, the ring and such element having opposing friction faces, a friction plate rotatable with the other element, and extending between said faces, spring means tending to press the pressure ring into clutching position, and operating means for releasing the clutch, comprising a throw-out sleeve arranged coaxially of the clutch, a lever thrusting at one end against the throw-out sleeve to be actuated thereby, and fulcrumed at its other end on the element with which the pressure ring rotates, and a pull link connected to the pressure ring and lever, the lever having a resilient portion to yieldingly transmit the motion of the throw-out sleeve to the pressure ring.

4. In a self contained clutch structure, the combination of driving and driven elements, the driven element including a shaft and an axially shiftable member, a throw-out collar slidable on the shaft, a spring tending to engage the shiftable member with the driving element, and a motion transmitting lever between the throw out collar and the shiftable member, the lever extending outwardly relatively to the shaft the lever having a flexible portion.

5. In a clutch the combination of driving and driven elements, one including an axially shiftable member, spring means for shifting said member into clutching position, and operating means for shifting said member out of clutching position, comprising a prime mover, a throw-out sleeve, a lever extending outwardly from the throw-out sleeve, and being fulcrumed at its outer end, and coacting at its inner end with the throw-out sleeve, and connected between its ends to the shiftable member, the lever having a bifurcated portion, one arm of which is resilient and engages the throw-out sleeve and the other branch of which limits the yielding of the resilient branch.

In testimony whereof I have hereunto signed my name at Syracuse, in the county of Onondaga and in the State of New York, this 21st day of August, 1924.

RALPH MURPHY.